United States Patent
Han (10) Patent No.: US 12,038,785 B2
(45) Date of Patent: Jul. 16, 2024

(54) FOLDABLE DISPLAY DEVICE

(71) Applicant: Wuhan China Star Optoelectronics Semiconductor Display Technology Co., Ltd., Hubei (CN)

(72) Inventor: Wen Han, Hubei (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 497 days.

(21) Appl. No.: 17/049,571

(22) PCT Filed: Jun. 24, 2020

(86) PCT No.: PCT/CN2020/098016
§ 371 (c)(1),
(2) Date: Oct. 22, 2020

(87) PCT Pub. No.: WO2021/232533
PCT Pub. Date: Nov. 25, 2021

(65) Prior Publication Data
US 2023/0114378 A1    Apr. 13, 2023

(30) Foreign Application Priority Data
May 19, 2020   (CN) .......................... 202010427172.2

(51) Int. Cl.
*G06F 1/16*    (2006.01)

(52) U.S. Cl.
CPC .......... *G06F 1/1652* (2013.01); *G06F 1/1616* (2013.01); *G06F 1/1641* (2013.01); *G06F 1/169* (2013.01); *G06F 2203/04102* (2013.01)

(58) Field of Classification Search
CPC .... G06F 1/1652; G06F 1/1641; G06F 1/1616; G06F 1/169; G06F 1/1637; H05K 5/0017;
(Continued)

(56) References Cited

U.S. PATENT DOCUMENTS 10,838,458 B1 * 11/2020 Park ..................... H04M 1/0216
2018/0097197 A1 * 4/2018 Han ..................... H05K 5/0017
(Continued)

FOREIGN PATENT DOCUMENTS

| CN | 107886846 | 4/2018 |
| CN | 108122491 | 6/2018 |

(Continued)

OTHER PUBLICATIONS

Notice of Rejection Dated Mar. 21, 2023 From the Korean Intellectual Property Office Re. Application No. 10-2021-7006158 and Its Translation Into English. (11 Pages).
(Continued)

*Primary Examiner* — Abhishek M Rathod (57) ABSTRACT

The present invention provides a foldable display device including a front frame, a bottom frame assembly, a display panel, and a supporting plate. The supporting plate includes a bending region, the bending region is provided with a plurality of openings, and the openings include a first long axis and a first short axis. A distance between inner walls of both sides of the openings in a direction of the first long axis gradually decreases from both ends of the openings to middle along the direction of the first long axis, thereby improving extension performance and ability to restore deformation, and reducing a risk of inner film layers of the foldable display device from being separated.

19 Claims, 7 Drawing Sheets

(58) Field of Classification Search
CPC .... H05K 5/0226; H05K 5/147; H05K 5/0217; H05K 5/03; H05K 5/028; H05K 5/0281; H05K 5/0284
See application file for complete search history.

(56) References Cited

U.S. PATENT DOCUMENTS

| | | | |
|---|---|---|---|
| 2018/0102496 A1 | 4/2018 | Kim | |
| 2019/0132947 A1* | 5/2019 | Koo | G06F 1/1652 |
| 2019/0132987 A1* | 5/2019 | Koo | H05K 7/18 |
| 2019/0207141 A1* | 7/2019 | Kim | H10K 77/111 |
| 2020/0168846 A1 | 5/2020 | Du | |
| 2020/0319672 A1* | 10/2020 | Kim | G06F 1/1641 |
| 2021/0083020 A1* | 3/2021 | Zhou | H10K 71/00 |
| 2021/0165454 A1* | 6/2021 | Dong | G06F 1/1652 |

FOREIGN PATENT DOCUMENTS

| | | |
|---|---|---|
| CN | 108766991 | 11/2018 |
| CN | 109032251 | 12/2018 |
| CN | 109628908 | 4/2019 |
| CN | 109638056 | 4/2019 |
| CN | 109817680 | 5/2019 |
| CN | 109887928 | 6/2019 |
| CN | 110335544 | 10/2019 |
| CN | 110649087 | 1/2020 |
| CN | 110767096 | 2/2020 |
| CN | 110853525 | 2/2020 |
| CN | 110992828 | 4/2020 |
| KR | 10-2016-0144912 | 12/2016 |
| KR | 10-1945985 | 2/2019 |
| KR | 10-2020-0052621 | 5/2020 |

OTHER PUBLICATIONS

Supplementary European Search Report Dated May 23, 2024 From the European Patent Office Re. Application No. 20929689.6. (10 Pages).

* cited by examiner

FOLDABLE DISPLAY DEVICE

RELATED APPLICATIONS

This application is a National Phase of PCT Patent Application No. PCT/CN2020/098016 having International filing date of Jun. 24, 2020, which claims the benefit of priority of Chinese Patent Application No. 202010427172.2 filed on May 19, 2020. The contents of the above applications are all incorporated by reference as if fully set forth herein in their entirety.

FIELD AND BACKGROUND OF THE INVENTION

The present disclosure relates to the field of display technology, and more particularly, to a foldable display device.

With development of display technology, consumer demand for display panels has become more diverse and personalized. Foldable display devices have advantages of being bendable and easy to carry, and are favored by consumers.

SUMMARY OF THE INVENTION

To alleviate problems of waviness and creases caused by repeated folding or unfolding of current foldable display devices, a metal sheet covering an entire surface of display panel and a supporting plate covering only a non-bending region of the display panel need to be respectively attached to a back side of the display panel, which not only increase difficulty of assembly and production costs, but also cause a step difference in the bending region of the display panel due to an incomplete coverage of the supporting plate, reducing flatness of the display device.

In summary, current foldable display devices have problems of poor flatness and difficulty in assembly. Therefore, it is necessary to provide a foldable display device to improve the defect.

An embodiment of the present disclosure provides a foldable display device which is configured to solve problems of poor flatness and difficulty in assembly of current foldable display devices.

The embodiment of the present disclosure provides a foldable display device, comprising a front frame and a bottom frame assembly configured to fold the foldable display device into a folded state and an unfolded state. The foldable display device further comprises a display panel disposed between the front frame and the bottom frame assembly, and a supporting plate disposed between the display panel and the bottom frame assembly, wherein the supporting plate comprises a bending region and non-bending regions on both sides of the bending region, the bending region comprises a dummy bending axis, the bending region is provided with a plurality of openings, the openings comprise a dummy first long axis and a dummy first short axis, the first long axis coincides with or is parallel to the bending axis, the first short axis is perpendicular to the bending axis, and a distance between inner walls of both sides of the openings in a direction of the first long axis gradually decreases from both ends to middle of the openings along the direction of the first long axis.

According one embodiment of the present disclosure, the openings are arranged in an array in the bending region, and the openings in two adjacent columns are staggered along a direction perpendicular to the bending axis.

According one embodiment of the present disclosure, along the direction perpendicular to the bending axis, an interval between the openings in one of the two adjacent columns of openings corresponds to the first short axis of the other column of the openings.

According one embodiment of the present disclosure, the supporting plate is provided with a plurality of bending openings arranged at intervals, and the bending openings are formed by boundaries on opposite sides of the bending region respectively extending toward the bending region along a direction of the bending axis.

According one embodiment of the present disclosure, the bending openings comprise a dummy second long axis and a dummy second short axis, the second long axis coincides with a direction of the first long axis of the opening in a same column, and a distance between inner walls of both sides of the bending openings extending along a direction of the second long axis gradually decreases from both ends to middle of the bending openings along the direction of the second long axis.

According one embodiment of the present disclosure, in the direction perpendicular to the bending axis, an odd number of columns of openings are spaced between adjacent bending openings on a same side, and a distance between the openings at both ends in a column of openings adjacent to the bending openings and boundaries between both sides of the bending region is greater than a distance between the second short axis and the boundary of the bending region.

According one embodiment of the present disclosure, the display panel comprises a panel bending region, and an orthographic projection region of the bending region of the supporting plate on the display panel covers the panel bending region.

According one embodiment of the present disclosure, a column of the openings is spaced between the adjacent bending openings along the direction perpendicular to the bending axis, a width of the bending region is W, a width of the panel bending region is Wd, and Wd≤W=n*W1+2W2, wherein along the direction perpendicular to the bending axis, n is a number of bending openings on one side of the supporting plate, W1 is a distance between a first end of the bending openings and a first end of the adjacent bending opening, and W2 is a maximum distance between the inner walls on both sides of the openings in the flattened state.

According one embodiment of the present disclosure, a length of the supporting plate in the direction of the bending axis is L, and L=N*L2+2L1, wherein along the direction of the bending axis, N is a number of openings in the column of openings adjacent to the bending openings, L2 is a distance between a first end of the openings and a first end of the adjacent openings in a same column, and L1 is a distance between the first end of the openings and the boundary of the bending region.

According one embodiment of the present disclosure, the bending region comprises a first bending region and a second bending region between the first bending region and the non-bending regions, the bending axis is located in the first bending region, and areas and/or densities of the openings in the first bending region and the second bending region are different.

According one embodiment of the present disclosure, the area of the openings in the first bending region is greater than the area of the openings in the second bending region, and a density of the openings in the first bending region is less than a density of the openings in the second bending region.

According one embodiment of the present disclosure, the area and density of each opening in the first bending region are equal, and the area and density of each opening in the second bending region are equal.

According one embodiment of the present disclosure, from the bending axis to the non-bending regions, a size of the openings gradually decreases, and the density of the openings gradually increases.

According one embodiment of the present disclosure, the openings in the first bending region are blind holes, and openings of the blind holes are toward a side away from or close to the display panel.

According one embodiment of the present disclosure, an elastic layer is disposed between the display panel and the supporting plate, and the elastic layer covers the supporting plate and fills the openings.

The embodiment of the present disclosure further provides a foldable display device, comprising a front frame and a bottom frame assembly configured to fold the foldable display device into a folded state and an unfolded state. The foldable display device further comprises a display panel disposed between the front frame and the bottom frame assembly, and a supporting plate disposed between the display panel and the bottom frame assembly, wherein the supporting plate comprises a bending region and non-bending regions on both sides of the bending region, the bending region comprises a dummy bending axis, the bending region is provided with a plurality of openings arranged in an array, the openings comprise a dummy first long axis and a dummy first short axis, the first long axis coincides with or is parallel to the bending axis, the first short axis is perpendicular to the bending axis, a distance between inner walls of both sides of the openings in a direction of the first long axis gradually decreases from both ends to middle of the openings along the direction of the first long axis, the openings in two adjacent columns are staggered along a direction perpendicular to the bending axis, and an interval between the openings in one of the two adjacent columns of openings corresponds to the first short axis of the other column of the openings.

According one embodiment of the present disclosure, the supporting plate is provided with a plurality of bending openings arranged at intervals, and the bending openings are formed by boundaries on opposite sides of the bending region respectively extending toward the bending region along a direction of the bending axis.

According one embodiment of the present disclosure, the bending openings comprise a dummy second long axis and a dummy second short axis, the second long axis coincides with a direction of the first long axis of the opening in a same column, and a distance between inner walls of both sides of the bending openings extending along a direction of the second long axis gradually decreases from both ends to middle of the bending openings along the direction of the second long axis.

According one embodiment of the present disclosure, in the direction perpendicular to the bending axis, an odd number of columns of openings are spaced between adjacent bending openings on a same side, and a distance between the openings at both ends in a column of openings adjacent to the bending openings and boundaries between both sides of the bending region is greater than a distance between the second short axis and the boundary of the bending region.

The embodiment of the present disclosure further provides a foldable display device, comprising a front frame and a bottom frame assembly configured to fold the foldable display device into a folded state and an unfolded state. The foldable display device further comprises a display panel disposed between the front frame and the bottom frame assembly, and a supporting plate disposed between the display panel and the bottom frame assembly, wherein the supporting plate comprises a bending region and non-bending regions on both sides of the bending region, the bending region comprises a dummy bending axis, the bending region is provided with a plurality of openings arranged in an array, a plurality of bending openings arranged at intervals are formed by boundaries on opposite sides of the bending region respectively extending toward the bending region along a direction of the bending axis, the openings comprise a dummy first long axis and a dummy first short axis, the first long axis coincides with or is parallel to the bending axis, the first short axis is perpendicular to the bending axis, a distance between inner walls of both sides of the openings in a direction of the first long axis gradually decreases from both ends to middle of the openings along the direction of the first long axis, the openings in two adjacent columns are staggered along a direction perpendicular to the bending axis, an interval between the openings in one of the two adjacent columns of openings corresponds to the first short axis of the other column of the openings, the bending openings comprise a dummy second long axis and a dummy second short axis, the second long axis coincides with a direction of the first long axis of the opening in a same column, and a distance between inner walls of both sides of the bending openings extending along a direction of the second long axis gradually decreases from both ends to middle of the bending openings along the direction of the second long axis.

The embodiment of the present disclosure further provides a foldable display device, by providing the plurality of openings in the bending region of the supporting plate, the distance between the inner walls of the both sides of the openings in the direction of the first long axis gradually decreases from the both ends of the openings to the middle along the direction of the first long axis. During folding process of the foldable display device, a portion with a short middle distance of the opening is easy to be stretched and widened, and has good extension performance and recovery ability, so that the supporting plate can be stretched and restored simultaneously with length change of the display panel during the bending process, thereby reducing stress and relative misalignment between the supporting plate and the display panel, and reducing a risk of film layers in the display panel from being separated. At the same time, an integrated supporting plate can provide good support for various portions of the display panel to improve flatness of the display device and reduce difficulty in assembling the display panel with the front frame and bottom frame assembly.

BRIEF DESCRIPTION OF THE SEVERAL VIEWS OF THE DRAWINGS

In order to illustrate technical solutions of the embodiments or prior art more clearly, drawings used in a description of the embodiments will be briefly described as below. Obviously, the drawings described as below are just some embodiments of the present disclosure. For those of ordinary skill in the art, under a premise of no creative labor, other drawings can also be obtained according to these drawings.

DESCRIPTION OF SPECIFIC EMBODIMENTS OF THE INVENTION

The following description of the embodiments with reference to the appended drawings is used for illustrating specific embodiments which may be used for carrying out the present disclosure. The directional terms described by the present disclosure, such as "upper", "lower", "front", "back", "left", "right", "inner", "outer", "side", etc., are only directions by referring to the accompanying drawings. Thus, the adopted directional terms are used to describe and understand the present disclosure, but the present disclosure is not limited thereto. In figures, elements with similar structures are indicated by the same numbers.

The disclosure will be further described below with reference to the drawings and specific embodiments:

An embodiment of the present disclosure provides a foldable display device, which will be described in detail below with reference to FIGS. 1 to 10.

Figure 1:
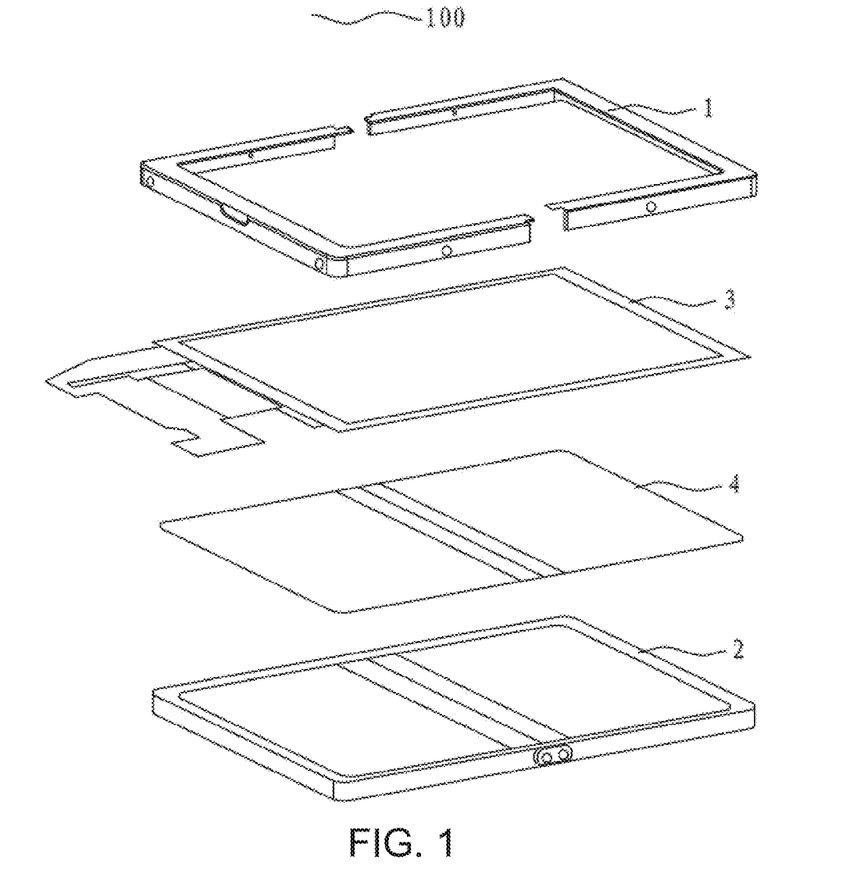
FIG. 1 is a schematic structural diagram of an entire foldable display device provided by an embodiment of the present disclosure.

As shown in FIG. 1, FIG. 1 is a schematic structural diagram of an entire foldable display device provided by an embodiment of the present disclosure. The foldable display device 100 comprises a front frame 1 and a bottom frame assembly 2 for folding thereof into a folded state and an unfolded state, and the foldable display device 100 further comprises a display panel 3 and a supporting plate 4. The front frame is configured to cover the display panel 3 and the bottom frame assembly 2, the bottom frame assembly 2 is configured to carry the front frame 1, the display panel 3, and the supporting plate 4, the display panel 3 is disposed between the front frame 1 and the bottom frame assembly 2, and the supporting plate 4 is disposed between the display panel 3 and the bottom frame assembly 2 and is located at a side of the display panel 3 away from a display surface thereof.

Figure 2:
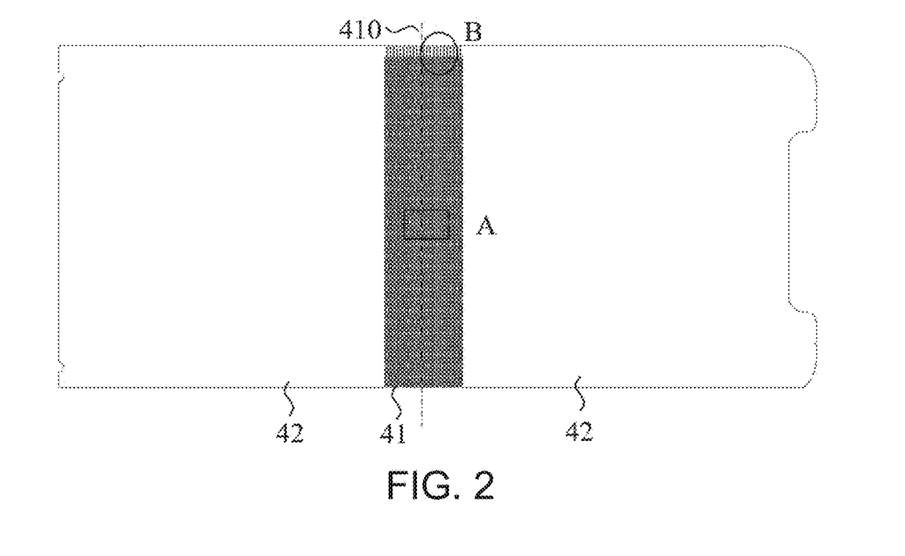
FIG. 2 is a schematic structural diagram of a supporting plate provided by the embodiment of the present disclosure.

As shown in FIG. 2, FIG. 2 is a schematic structural diagram of a supporting plate provided by the embodiment of the present disclosure. The supporting plate 4 comprises a bending region 41 and a non-bending region 42 on both sides of the bending region 41, the bending region 41 comprises a dummy bending axis 410, and the supporting plate 4 can be unfolded or folded along the bending axis 410.

Figure 3:
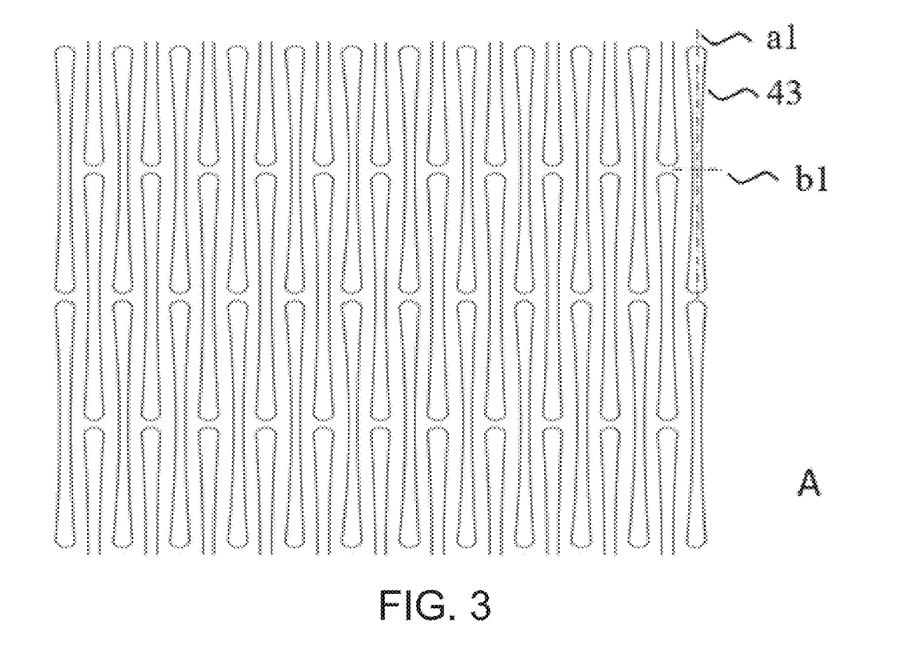
FIG. 3 is a schematic diagram of detail part A in FIG. 2.

As shown in FIG. 3, FIG. 3 is a schematic diagram of detail part A in FIG. 2. The bending region 41 is provided with a plurality of openings 43, the opening 43 comprises a dummy first long axis a1 and a dummy first short axis b1, the first long axis a1 of the opening 43 located on the bending axis 410 coincides with the bending axis 410, a direction of the first long axis a1 of the other openings 43 is parallel with a direction of the bending axis 410, and a direction of the first short axis b1 is perpendicular to a direction of the bending axis 410. An orthographic projection pattern of the opening 43 on the support plate 4 may be respectively symmetrical about the first long axis a1 and the first short axis b1.

A distance between inner walls of both sides of the openings 43 in the direction of the first long axis a1 gradually decreases from both ends to middle of the openings (that is, a position of the first short axis b1) along the direction of the first long axis a1, which forms a "dog bone" shape with a greater distance between side walls of both ends of the opening and a narrow middle distance as shown in FIG. 3. The opening 43 is stretched and widened when the supporting plate 4 is bent and tensioned, and a thinner portion in the middle is affected by tensile stress on both sides, so that the supporting plate 4 has excellent extension performance. During folding process of the foldable display device, the supporting plate 4 can be stretched and extended simultaneously with length change of the display panel 3, which gives the display panel 3 space for the length change and can disperse and reduce the stress of the supporting plate 4 during folding thereof, thereby accordingly reducing compression stress on the display panel 3, reducing relative misalignment between the supporting plate 4 and the display panel 3, and reducing a risk of the supporting plate 4 from being separated from the display panel 3 and inner film layers of the display panel 3.

Specifically, as shown in FIG. 3, the openings 43 are arranged in an entire bending region 41 according to a certain density array which forms a discontinuous grid structure, and any two adjacent columns of openings 43 are staggered. On the one hand, a density of the openings 43 arranged in the bending region 41 can be increased; on the other hand, staggered openings 43 are affected by material strength of an adjacent unopened portion. After bending force disappears, a stretched portion in the middle of the openings 43 can be quickly restored to its original state, so that the supporting plate 4 has a good ability to restore deformation, reduce waviness and creases caused by repeated folding and unfolding of the display panel, and ensure flatness of the display panel 3 after the unfolded state is restored.

Moreover, an interval between the openings 43 in one of the two adjacent columns of openings along a direction perpendicular to the bending axis 410 corresponds to the first short axis b1 of the other column of the openings 43. Therefore, the opening 43 is provided with a highest density, and a middle portion of the opening 43 corresponds to a portion with the most unopened material, which gives the openings 43 enough tensile deformation space, and at the same time does not affect a wall thickness of a greater portion of the both ends of the opening 43. Hence, under condition of ensuring sufficient strength of the bending region of the supporting plate 4, extension performance and recovery ability of the supporting plate are improved, and an extension rate of the supporting plate 4 can reach more than 10%.

In addition, in some embodiments, as a modified structure of an arrangement of the openings 43, two adjacent columns of openings 43 may also be arranged in parallel. Therefore, a technical effect of improving extension performance of the supporting plate, and dispersing and reducing stress in the bending region 41 can also be realized, which is not limited herein.

Moreover, a shape of the orthographic projection pattern of the two side walls of the opening 43 corresponding to the first long axis a1 on the supporting plate 4 is an arc, and a curvature or radian R of the arc can be calculated according to extension length of the supporting plate 4 in the folded state, deformation amount of the opening 43, and a number of the opening 43. In addition, the shape of the orthographic projection pattern of the two side walls of the opening 43 corresponding to the first long axis a1 on the supporting plate 4 is not limited to the arc shape. In some embodiments, it can also be any other curve, and no specific restrictions are made here.

Moreover, the opening 43 provided by the embodiment of the present disclosure comprises but is not limited to a through-hole or a blind hole. Therefore, the supporting plate 4 can be dispersed and reduce stress during bending.

Figure 4:
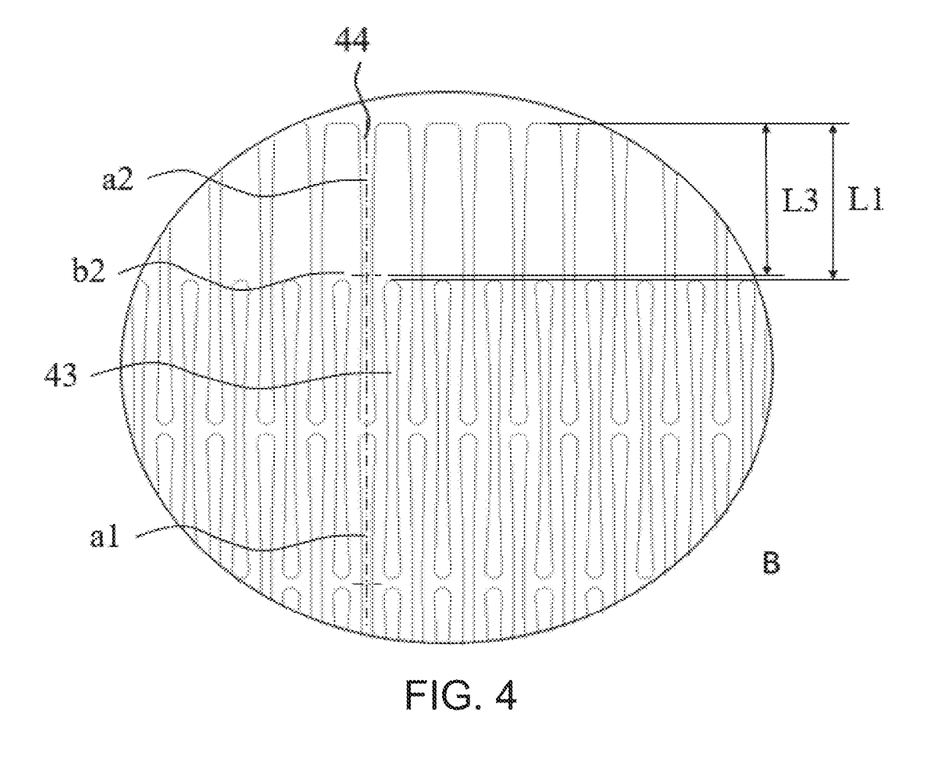
FIG. 4 is a schematic diagram of detail part B in FIG. 2.

As shown in FIG. 4, FIG. 4 is a schematic diagram of detail part B in FIG. 2. The supporting plate 4 is further provided with a plurality of bending openings 44 arranged at intervals, the bending openings 44 are formed by boundaries on opposite sides of the bending region 41 respectively extending toward the bending region 41 along the direction of the bending axis 410, and an opening direction of the bending opening 44 is equal to or opposite to the direction of the first long axis a1 of the opening 43.

Specifically, the bending opening 44 comprises a dummy second long axis a2 and a dummy second short axis b2, the second long axis a2 coincides with the direction of the first long axis a1 of the opening 43 in a same column, and the second short axis b2 is perpendicular to the second long axis a2. A distance between inner walls of both sides of the bending openings 44 extending along a direction of the second long axis a2 gradually decreases from both ends to middle of the bending openings 44 (that is, a position of the second short axis) along the direction of the second long axis a2, that is, from an end of the bending openings 44 away from a boundary of the bending region 41 to the second short axis b2, the distance between the inner walls on both sides of the bending openings 44 gradually decreases; from the second short axis b2 to the bending opening 44 located at the opening of a boundary of the bending region 41, the distance between the inner walls on both sides gradually increases, which not only improves extension performance of the supporting plate 4 and reduces squeezing stress on the display panel 3 during the bending process on both sides of the bending region 41, but can reduce an amount of shrinkage caused by deformation of the both sides of the bending region 41 of the supporting plate 4 during the bending process and the depression from the both sides to an inside of the bending region 41, thereby improving support effect on the display panel 3 at boundaries between the both sides of the bending region 41 of the supporting plate 4, and eliminating creases caused by the corresponding display panel 3 without the supporting plate 4 at boundaries between the both sides of the bending region 41 caused by the shrinkage on both sides.

Figure 5:
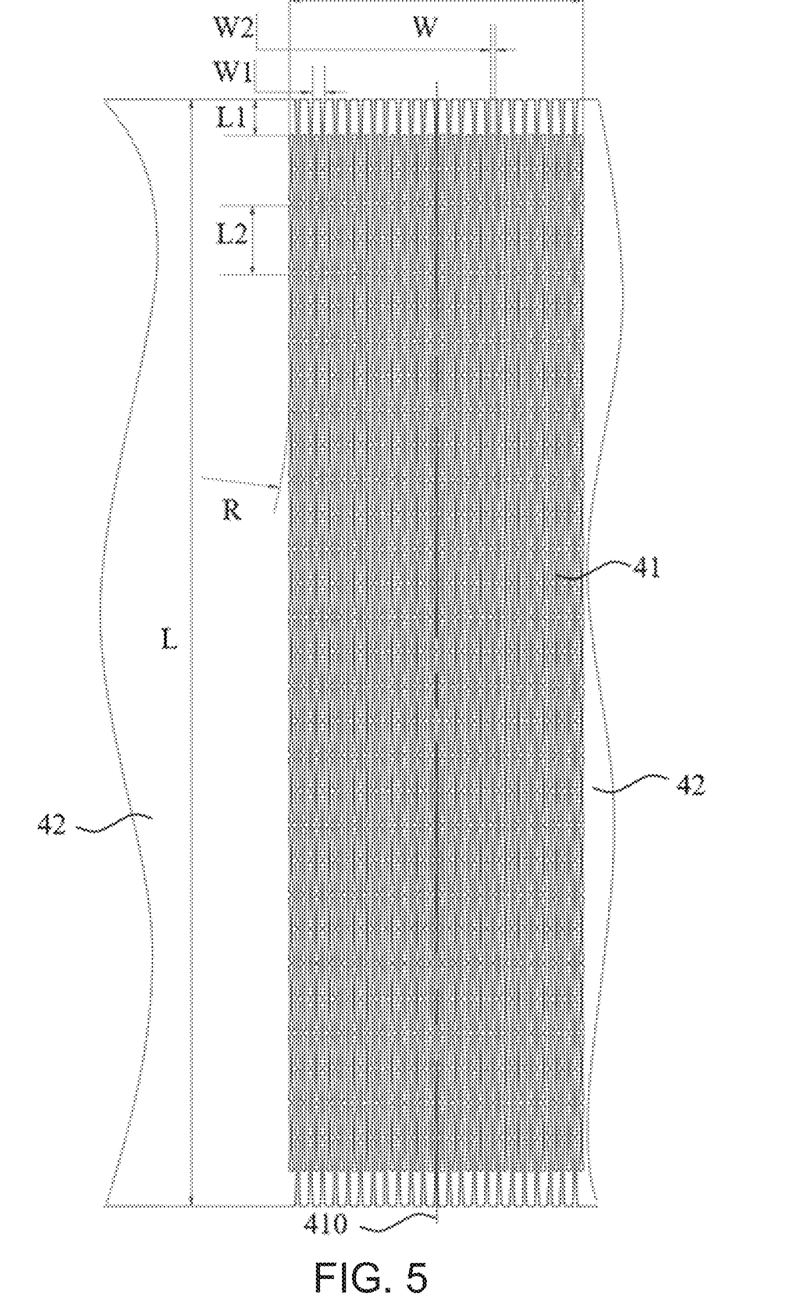
FIG. 5 is a schematic structural diagram of a bending region of the supporting plate provided by the embodiment of the present disclosure.

Furthermore, as shown in FIG. 5, a column of the openings 43 is spaced between adjacent bending openings 44 on a same side of the bending region 41 along the direction perpendicular to the bending axis 410. A distance L1 between the opening 43 at both ends in a column of openings adjacent to the bending openings 44 and the boundaries between the both sides of the bending region 41 is greater than a distance L3 between the second short axis b2 and the boundary of the bending region 41, so that the bending opening 44 is provided without openings 43 on both sides of a portion from the second short axis b2 to the opening at boundary, to increase an area of the portion where the opening 43 is not provided around the bending opening 44 on the both sides of the bending region 41, to improve strength of the boundaries on both sides of the bending region 41 of the supporting plate 4, and to improve bending resistance of the supporting plate 4, thereby preventing the boundaries of the both sides of the bending region 41 from breaking due to concentrated stress during the bending process. Moreover, in some embodiments, adjacent openings on a same side can also be spaced with 3 columns or 5 columns of odd-numbered columns of openings, and can also obtain good bending resistance, which is not limited herein.

In the embodiment of the present disclosure, the display panel 3 comprises a panel bending region and a panel non-bending region located at both sides of the panel bending region. In the unfolded state, an orthographic projection region of the bending region 41 of the supporting plate 4 on the display panel 3 covers the panel bending region, and a width of the bending region 41 of the supporting plate 4 in the direction perpendicular to the bending axis 410 is greater than a width of the panel bending region in the direction perpendicular to the bending axis. The bending region 41 of the supporting plate 4 beyond the bending region of the panel is stretched and extended during the bending process, which can provide enough space for stress relief and strain dislocation movement at a junction of the panel bending region and the panel non-bending region of the display panel 3, and reduce a risk of film layers of the display panel 3 from being separated.

In order to ensure sufficient space for stress relief, in the unfolded state, the width of any side of the bending region 41 in the direction perpendicular to the bending axis 410 is at least 1 mm greater than the same side of the panel bending region.

Specifically, as shown in FIG. 5, FIG. 5 is a schematic structural diagram of the bending region of the supporting plate provided by the embodiment of the present disclosure. In the unfolded state, a column of the openings is spaced between the adjacent bending openings along the direction perpendicular to the bending axis 410, a number of bending openings 44 provided on one side of the supporting plate 4 is n, a distance between a first end of the bending openings 44 and a first end of the adjacent bending opening is W1, a maximum distance between the inner walls on both sides of the openings 43 in the direction of the first long axis a1 is W2, and a width of the bending region 41 is W, wherein a width of the panel bending region of the display panel 3 is $Wd \leq W = n*W1 + 2W2$.

Along the direction to the bending axis 410, a number of the opening 43 in a column of openings adjacent to the bending openings 44 is N, a distance between the first end of the openings 43 and the boundary of the bending region 41 is L1, a distance between the first end of the openings 43 and the first end of the adjacent openings in a same column is L2, wherein a length of the supporting plate 4 in the direction of the bending axis 410 is $L = N*L2 + 2L1$.

Figure 6:
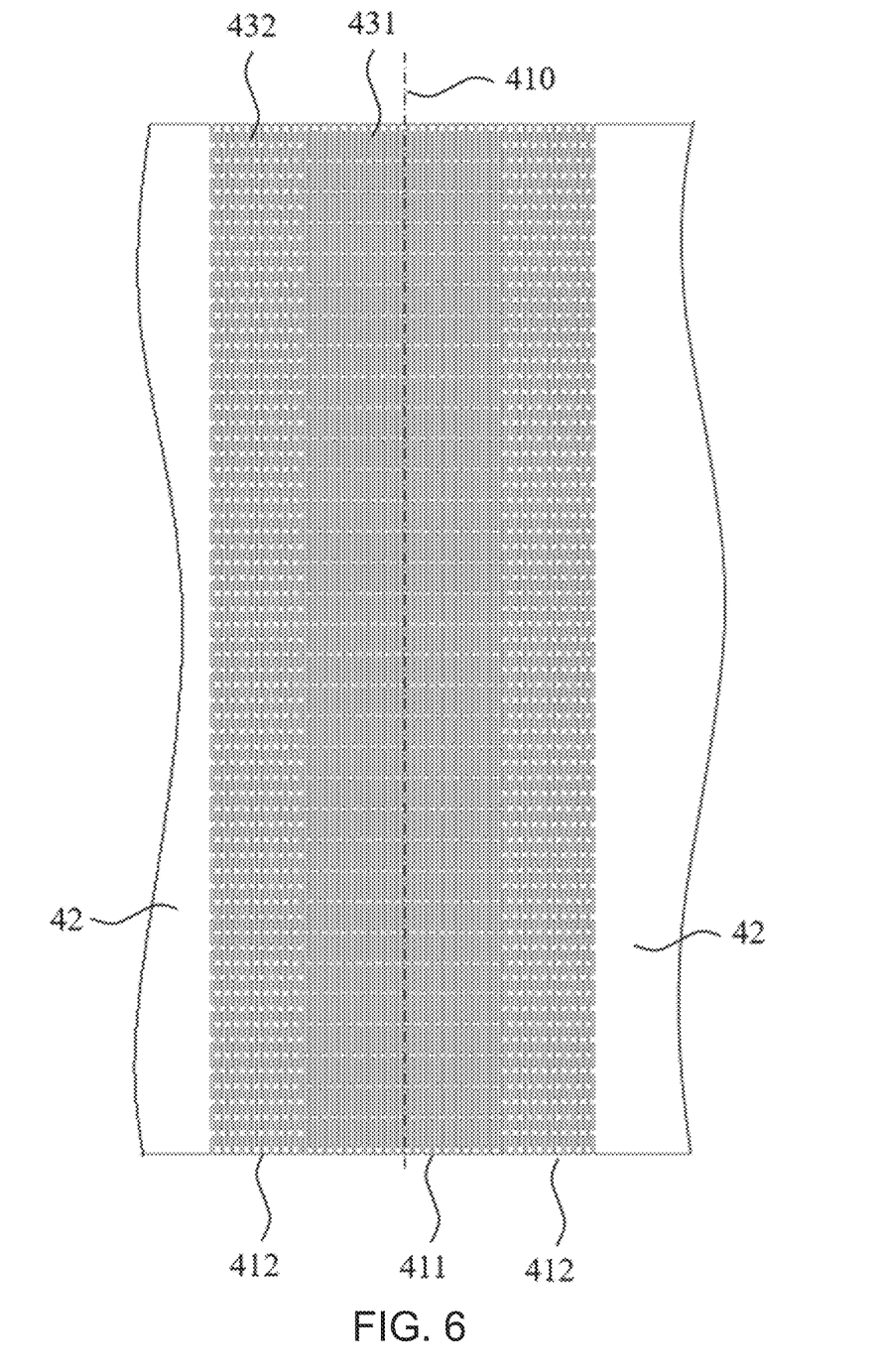
FIG. 6 is another schematic structural diagram of the supporting plate provided by the embodiment of the present disclosure.

The embodiment of the present disclosure further provides a foldable display device, the foldable display device has substantially the same structure as the foldable display device provided in the above embodiments, and difference is shown in FIG. 6. FIG. 6 is another schematic structural diagram of the supporting plate provided by the embodiment of the present disclosure. The bending region 41 of the supporting plate 4 comprises a first bending region 411 and a second bending region 412 between the first bending region 411 and the non-bending region 42, the bending axis 410 is located in the first bending region 411, the first bending region 411 comprises a first opening 431, the second bending region 412 comprises a second opening 432, and a size and a density of the first opening 431 and a size and a density of the second opening 432 are different.

Figure 7:
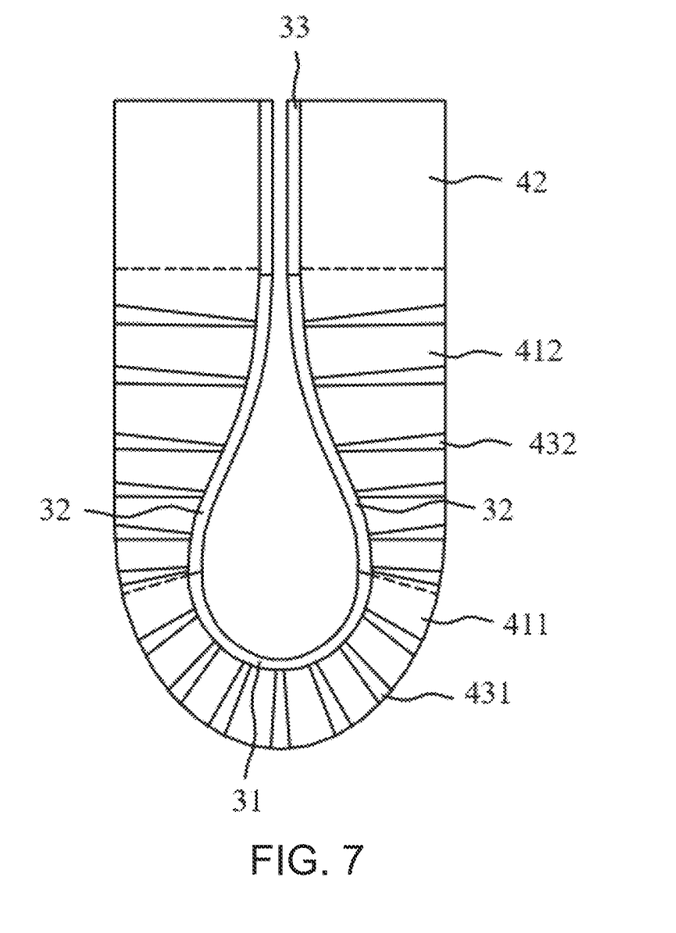
FIG. 7 is a schematic diagram of a folded state of a display panel provided by the embodiment of the present disclosure.

As shown in FIG. 7, FIG. 7 is a schematic diagram of a folded state of a display panel provided by the embodiment of the present disclosure. The panel bending region of the display panel 3 further comprise a first panel bending region 31 and a second panel non-bending region 32 between the first panel bending region 31 and the panel non-bending region 33, and the second panel bending region 31 is in a bending transition region of the first panel bending region 31 and the panel non-bending region 33. When the display panel 3 is bent to the folded state, display surfaces of both sides of the panel non-bending region 32 are arranged relatively parallel, the bending region of the panel forms a drop shape, the first panel bending region 31 is concavely bent inward, and the second panel bending region 31 is convexly bent toward the second panel bending region 31 on the opposite side. A slope of the second panel bending region 32 is greater than a slope of the first panel bending region 31, which results in the second panel bending region 32 receiving a greater stress than the first panel bending region 31, so that relative misalignment of the second panel bending region 32 is greater than that of the first panel bending region 31, and the risk of film separation is higher than that of the first panel bending region 31.

Preferably, the size of the first opening 431 in the first bending region 411 should be greater than the size of the second opening 432 in the second bending 412, and the density of the first opening 431 in the first bending region 411 should be less than the density of the second opening 432 in the second bending region 412. By reducing the size of the openings and increasing the density of the openings, extension performance and ability to recover deformation of the second bending region 412 of the supporting plate are greater than that of the first bending region 411, and the second bending region 412 is dispersed and reduced stress during bending, thereby correspondingly reducing stress received by the second panel bending region 32, so that forces on the display panel 3 are balanced, and the risk of film layers being separated is reduced.

Furthermore, the size and density of the openings 43 in the bending region 41 are a multi-step change, that is, the size and density of each first opening 431 in the first bending region 411 are equal, and the size and density of each second opening 432 in the second bending region 412 are equal, which can disperse and reduce stress of the second bending region 412 during bending, so that stress in each portion of the display panel 3 is balanced, thereby reducing the risk of film layers from being separated. In addition, the multi-step change of the size and density of the openings 41 in the bending region 41 is not limited to the three-step change provided by the embodiment of the present disclosure, in other embodiments, it can also comprise fewer or more steps of changes, all of which can realize the above technical effects, which is not limited herein.

Moreover, in some embodiments, the size and density of the openings 43 in the bending region 41 can also gradually change, that is, along the bending axis 410 to the non-bending region 42, along the bending axis to a boundary between the first bending region 411 and the second bending region 421, or along the boundary between the first bending region 411 and the second bending region to the non-bending region 42, the size of the openings 43 is decreasing (or increasing), the density of the openings 43 is increasing (or decreasing), which can also realize same technical effects as the above embodiments, and is not limited herein.

As a deformed structure of the size and density setting method of the opening 43 in the bending region 41, only the first bending region 411 and the second bending region 412 can maintain change of one of the size or density of the openings, while the other remains the same. Therefore, effects of increasing the bending performance and restoring deformability of the supporting plate 4, and dispersing and reducing stress of the bending region 41 of the supporting plate 4 can also be realized.

Furthermore, the second opening 432 in the second bending region 412 is a through-hole, the first opening 431 in the first bending region 411 is a blind hole, and an opening of the blind hole is towards a side away from the display panel 3 or close to the display panel 3.

Preferably, the opening of the blind hole is towards the side away from the display panel 3, and an unopened portion of the first bending region 411 of the supporting plate 4 remains flat. Therefore, in the case of through-holes combined with blind holes, not only can sufficient extension performance of the supporting plate 4 and recovering deformability be supported, but also a flat portion of the supporting plate 4 can support the first panel bending region 31, which reduces waviness and creases caused by repeated folding and unfolding of the display panel 3, and improves flatness of the display panel 3. Moreover, in some embodiments, the opening of the blind hole may also be towards the side close to the display panel 3, which can also realize the effect of improving extension performance of the supporting plate 4 and restoring the deformability, and is not limited herein.

Figure 8:
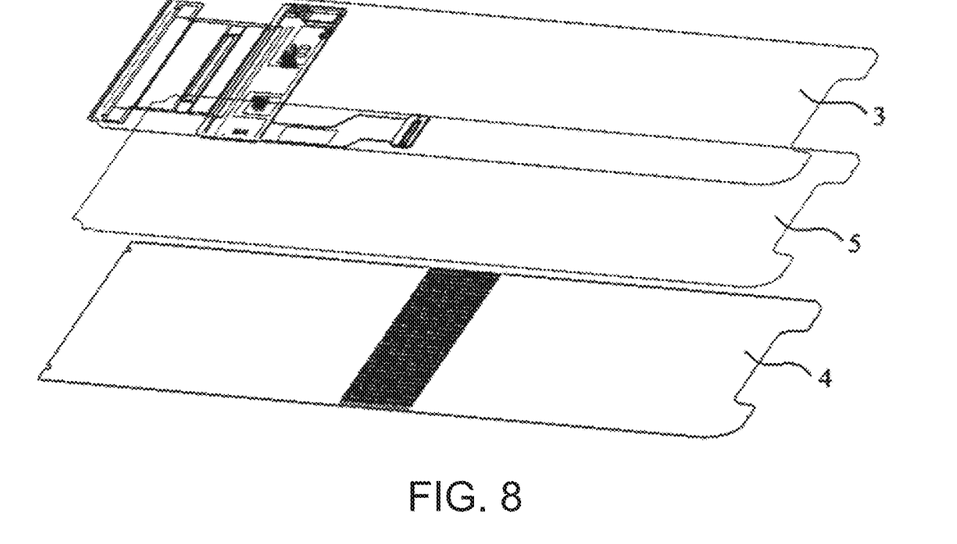
FIG. 8 is a schematic diagram of bonding of the supporting plate and the display panel provided by the embodiment of the present disclosure.
Figure 9:
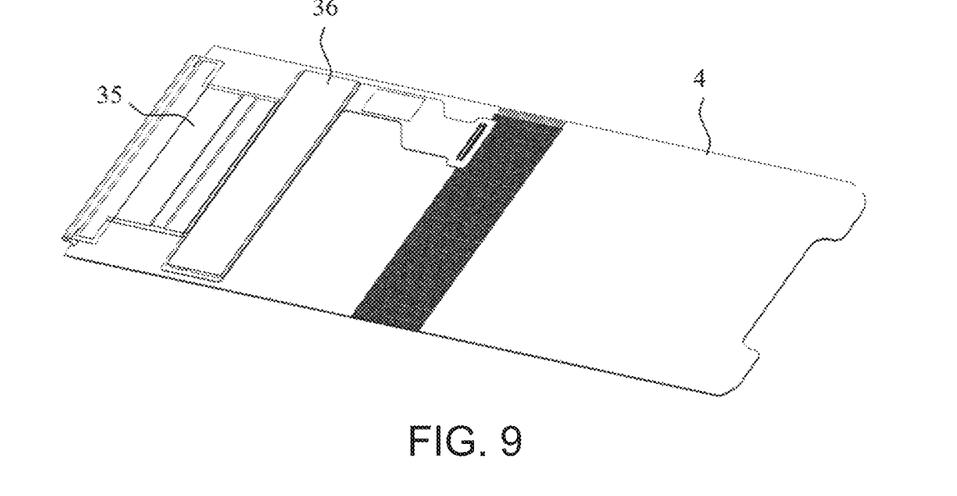
FIG. 9 is a schematic bending diagram of bending of a flip-chip film and a flexible circuit board of the display panel provided by the embodiment of the present disclosure.

In the embodiment of the present disclosure, as shown in FIG. 8, the display panel 3 and the supporting plate 4 are bonded by an entire surface of a flexible foldable optical adhesive layer 5. As shown in FIG. 9, the display panel 3 comprises a flip-chip film 35 and a flexible circuit board 36, the flip-chip 35 and the flexible circuit board 36 can be bent to a side of the supporting plate 4 away from the display panel 3. Therefore, a bending of the display panel 3 is not affected, and screen ratio of the foldable display device 100 can also be improved.

Figure 10:
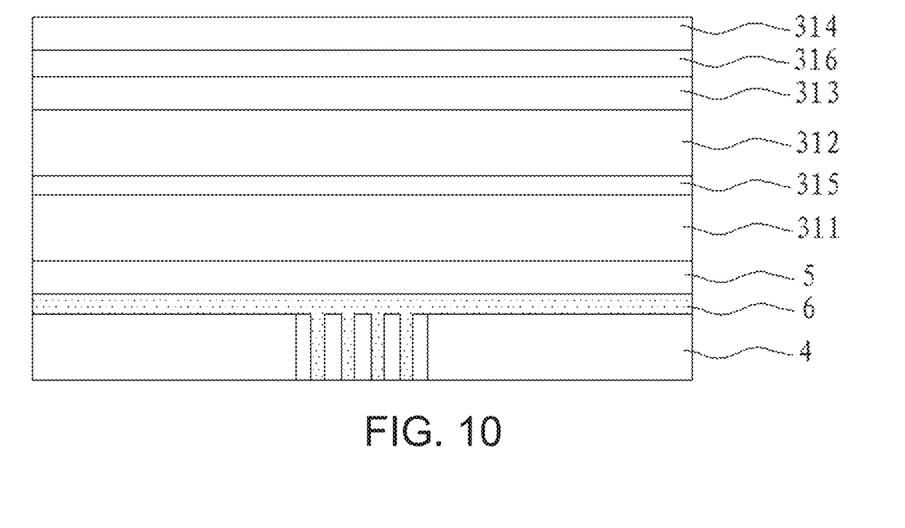
FIG. 10 is a schematic structural diagram of film layers provided by the embodiment of the present disclosure.

Specifically, as shown in FIG. 10, FIG. 10 is a schematic structural diagram of film layers provided by the embodiment of the present disclosure. The display panel 3 further comprise a back plate 311, a touch control display device layer 312, a polarizer 313, and a package cover 314 that are laminated, the back plate 311 and the touch control display device layer 312 are bonded by a pressure-sensitive adhesive layer 315, and the package cover 314 and the polarizer 313 are bonded by an optical adhesive layer 316.

Preferably, an elastic layer 6 is disposed between the display panel 3 and the supporting plate 4, the elastic layer is disposed between the supporting plate 4 and a foldable optical adhesive layer 5, and covers the supporting plate 4 on an entire surface. In the preferred embodiment, a material of the elastic layer 6 is silicone resin that is liquid before curing and has good fluidity. When the silicone resin is screen-printed on a surface of the supporting plate 4, the silicone material can be filled into the opening 43, and after curing, an integrated grid structure can be formed with the opening 43 of the supporting plate. The silicone material has good elasticity and elongation properties. During bending of the supporting plate 4 and the display panel 3, the elastic layer 6 can follow the adjacent flexible foldable optical adhesive layer 5 to move simultaneously, thereby reducing relative misalignment between the supporting plate 4 and the display panel 3, and reducing a risk of film layers between the display panel 3 and the adjacent film layer from being separated. At the same time, the elastic layer 6 is filled into the opening 43, which can further provide the opening 43 with a good ability to recover from deformation, so that the display panel 3 can be quickly restored to the unfolded state after being folded, thereby effectively eliminating creases and ripples caused by folding.

Moreover, in other embodiments, the elastic layer 6 can also be replaced by a foam rubber layer, which also has good elongation performance and recovery deformation ability, and can achieve a same technical effect as the elastic layer 6.

In the embodiment of the present disclosure, a material of the supporting plate 4 is stainless steel (SUS), which has strong toughness and plasticity, and can not only provide good extension performance for the bending region 41 of the supporting plate 4, but also good strength of the supporting plate itself can further provide good support capacity for each portion of the display panel 3, thereby improving flatness of the display panel 3 when it is unfolded, reducing difficulty of assembling and matching the flexible display panel 3 with the front frame and bottom frame assembly. Moreover, there is no need to replace flexible assembly equipment, reducing investment costs.

In addition, in order to ensure good strength and elongation of the supporting plate 4, a thickness of the supporting plate 4 should range from 0.02 mm to 1 mm. If the thickness is too thin, supporting strength of the supporting plate 4 is insufficient, and if the thickness is too thick, extension performance and deformation recovery ability of the supporting plate 4 are deteriorated, and a specific value can be selected according to actual needs, which is not limited herein.

Moreover, in some embodiments, the supporting plate 4 can replace an original back plate 31 in the display panel 3, which is conducive to reducing a thickness of the display panel 3 and reducing stress between the film layers, thereby reducing the relative misalignment between the film layers, reducing the risk of the film layers from being separated, improving the bending resistance of the display panel 3, and also saving the cost of the back plate 31 and reducing corresponding manufacturing process.

Moreover, in other embodiments, the material of the supporting plate 4 can also be the same or similar material such as Al, Mg, or liquid metal, and can realize the same technical effect as the above-mentioned stainless steel material, which is not limited herein.

Beneficial effects of the embodiment of the present disclosure are that: the embodiment of the present disclosure further provides a foldable display device. By providing the plurality of openings in the bending region of the supporting plate, the distance between the inner walls of the both sides of the openings in the direction of the first long axis gradually decreases from the both ends of the openings to the middle along the direction of the first long axis. During folding process of the foldable display device, a portion with a short middle distance of the opening is easy to be stretched and widened, and has good extension performance and recovery ability, so that the supporting plate can be stretched and restored simultaneously with length change of the display panel during the bending process, thereby reducing stress and relative misalignment between the supporting plate and the display panel, and reducing a risk of film layers in the display panel from being separated. At the same time, an integrated supporting plate can provide good support for various portions of the display panel to improve flatness of the display device and reduce difficulty in assembling the display panel with the front frame and bottom frame assembly.

As mentioned above, while the present disclosure has been disclosed via preferred embodiments as above, the preferred embodiments are not intended to limit the disclosure. Those skilled in the art can make various modifications and alternations without departing from the spirit and scope of the disclosure. The scope of protection of the disclosure is defined by the claims.

What is claimed is:

1. A foldable display device, comprising a front frame and a bottom frame assembly configured to fold the foldable display device into a folded state and an unfolded state, wherein the foldable display device comprises:
    a display panel disposed between the front frame and the bottom frame assembly; and
    a supporting plate disposed between the display panel and the bottom frame assembly;
    wherein the supporting plate comprises a bending region and non-bending regions on both sides of the bending region, the bending region comprises a dummy bending axis, the bending region is provided with a plurality of openings, the openings comprise a dummy first long axis and a dummy first short axis, the first long axis coincides with or is parallel to the bending axis, the first short axis is perpendicular to the bending axis, and a distance between inner walls of both sides of the openings in a direction of the first long axis gradually decreases from both ends to middle of the openings along the direction of the first long axis;
    the bending region comprises a first bending region away from the non-bending regions and a second bending region between the first bending region and the non-bending regions, the bending axis is located in the first bending region, a density of the openings in the first bending region is less than that of the openings in the second bending region when the display device is in an in-folding form in which non-bending regions of the display panel corresponding to the non-bending regions of the supporting plate are folded to face and are adjacent to each other, and
    a width of any side of the bending region of the supporting plate is at least 1 mm greater than a width of the same side of a bending region of the display panel in a direction perpendicular to the bending axis.

2. The foldable display device as claimed in claim 1, wherein the openings are arranged in an array in the bending region, and the openings in two adjacent columns are staggered along a direction perpendicular to the bending axis.

3. The foldable display device as claimed in claim 2, wherein along the direction perpendicular to the bending axis, an interval between the openings in one of the two adjacent columns of openings corresponds to the first short axis of the other column of the openings.

4. The foldable display device as claimed in claim 2, wherein the supporting plate is provided with a plurality of bending openings arranged at intervals, and the bending openings are formed by boundaries on opposite sides of the bending region respectively extending toward the bending region along a direction of the bending axis.

5. The foldable display device as claimed in claim 4, wherein the bending openings comprise a dummy second long axis and a dummy second short axis, the second long axis coincides with a direction of the first long axis of the opening in a same column, and a distance between inner walls of both sides of the bending openings extending along a direction of the second long axis gradually decreases from both ends to middle of the bending openings along the direction of the second long axis.

6. The foldable display device as claimed in claim 5, wherein in the direction perpendicular to the bending axis, an odd number of columns of openings are spaced between adjacent bending openings on a same side, and a distance between the openings at both ends in a column of openings adjacent to the bending openings and boundaries between both sides of the bending region is greater than a distance between the second short axis and the boundary of the bending region.

7. The foldable display device as claimed in claim 1, wherein a column of the openings is spaced between the adjacent bending openings along the direction perpendicular to the bending axis; and
the width of the bending region of the supporting plate is W, the width of the bending region of the display panel is less than W, wherein W=n*W1+2W2;
wherein along the direction perpendicular to the bending axis, n is a number of bending openings on one side of the supporting plate, W1 is a distance between a first end of the bending openings and a first end of the adjacent bending opening, and W2 is a maximum distance between the inner walls on both sides of the openings in the unfolded state.

8. The foldable display device as claimed in claim 7, wherein a length of the supporting plate in the direction of the bending axis is L, and L=N*L2+2L1;
wherein along the direction of the bending axis, N is a number of openings in the column of openings adjacent to the bending openings, L2 is a distance between a first end of the openings and a first end of the adjacent openings in a same column, and L1 is a distance between the first end of the openings and the boundary of the bending region.

9. The foldable display device as claimed in claim 1, wherein areas of the openings in the first bending region and the second bending region are different.

10. The foldable display device as claimed in claim 9, wherein the area of the openings in the first bending region is greater than the area of the openings in the second bending region.

11. The foldable display device as claimed in claim 10, wherein an area of each opening in the first bending region is equal to each other, and an area of each opening in the second bending region is equal to each other.

12. The foldable display device as claimed in claim 10, wherein from the bending axis to the non-bending regions, a size of the openings gradually decreases, and the density of the openings gradually increases.

13. The foldable display device as claimed in claim 1, wherein the openings in the first bending region are blind holes, and openings of the blind holes are toward a side away from or close to the display panel.

14. The foldable display device as claimed in claim 1, wherein an elastic layer is disposed between the display panel and the supporting plate, and the elastic layer covers the supporting plate and fills the openings.

15. A foldable display device, comprising a front frame and a bottom frame assembly configured to fold the foldable display device into a folded state and an unfolded state, wherein the foldable display device comprises:

a display panel disposed between the front frame and the bottom frame assembly; and
a supporting plate disposed between the display panel and the bottom frame assembly;
wherein the supporting plate comprises a bending region and non-bending regions on both sides of the bending region, the bending region comprises a dummy bending axis, the bending region is provided with a plurality of openings arranged in an array, the openings comprise a dummy first long axis and a dummy first short axis, the first long axis coincides with or is parallel to the bending axis, the first short axis is perpendicular to the bending axis, a distance between inner walls of both sides of the openings in a direction of the first long axis gradually decreases from both ends to middle of the openings along the direction of the first long axis, the openings in two adjacent columns are staggered along a direction perpendicular to the bending axis, and an interval between the openings in one of the two adjacent columns of openings corresponds to the first short axis of the other column of the openings;
the bending region comprises a first bending region away from the non-bending regions and a second bending region between the first bending region and the non-bending regions, the bending axis is located in the first bending region, a density of the openings in the first bending region is less than that of the openings in the second bending region when the display device is in an in-folding form in which non-bending regions of the display panel corresponding to the non-bending regions of the supporting plate are folded to face and are adjacent to each other, and
a width of any side of the bending region of the supporting plate is at least 1 mm greater than a width of the same side of a bending region of the display panel in a direction perpendicular to the bending axis.

16. The foldable display device as claimed in claim 15, wherein the supporting plate is provided with a plurality of bending openings arranged at intervals, and the bending openings are formed by boundaries on opposite sides of the bending region respectively extending toward the bending region along a direction of the bending axis.

17. The foldable display device as claimed in claim 16, wherein the bending openings comprise a dummy second long axis and a dummy second short axis, the second long axis coincides with a direction of the first long axis of the opening in a same column, and a distance between inner walls of both sides of the bending openings extending along a direction of the second long axis gradually decreases from both ends to middle of the bending openings along the direction of the second long axis.

18. The foldable display device as claimed in claim 17, wherein in the direction perpendicular to the bending axis, an odd number of columns of openings are spaced between adjacent bending openings on a same side, and a distance between the openings at both ends in a column of openings adjacent to the bending openings and boundaries between both sides of the bending region is greater than a distance between the second short axis and the boundary of the bending region.

19. A foldable display device, comprising a front frame and a bottom frame assembly configured to fold the foldable display device into a folded state and an unfolded state, wherein the foldable display device comprises:

a display panel disposed between the front frame and the bottom frame assembly; and a supporting plate disposed between the display panel and the bottom frame assembly;

wherein the supporting plate comprises a bending region and non-bending regions on both sides of the bending region, the bending region comprises a dummy bending axis, the bending region is provided with a plurality of openings arranged in an array, a plurality of bending openings arranged at intervals are formed by boundaries on opposite sides of the bending region respectively extending toward the bending region along a direction of the bending axis, the openings comprise a dummy first long axis and a dummy first short axis, the first long axis coincides with or is parallel to the bending axis, the first short axis is perpendicular to the bending axis, a distance between inner walls of both sides of the openings in a direction of the first long axis gradually decreases from both ends to middle of the openings along the direction of the first long axis, the openings in two adjacent columns are staggered along a direction perpendicular to the bending axis, an interval between the openings in one of the two adjacent columns of openings corresponds to the first short axis of the other column of the openings, the bending openings comprise a dummy second long axis and a dummy second short axis, the second long axis coincides with a direction of the first long axis of the opening in a same column, and a distance between inner walls of both sides of the bending openings extending along a direction of the second long axis gradually decreases from both ends to middle of the bending openings along the direction of the second long axis;

the bending region comprises a first bending region away from the non-bending regions and a second bending region between the first bending region and the non-bending regions, the bending axis is located in the first bending region, a density of the openings in the first bending region is less than that of the openings in the second bending region when the display device is in an in-folding form in which non-bending regions of the display panel corresponding to the non-bending regions of the supporting plate are folded to face and are adjacent to each other, and a width of any side of the bending region of the supporting plate is at least 1 mm greater than a width of the same side of a bending region of the display panel in a direction perpendicular to the bending axis.

* * * * *